United States Patent
Koseki (10) Patent No.: US 7,596,059 B2
(45) Date of Patent: *Sep. 29, 2009

(54) DISC CHANGER HAVING DISC PUSHING DEVICE

(75) Inventor: Tomohisa Koseki, Kobe (JP)

(73) Assignee: Fujitsu Ten Limited, Kobe-Shi, Hyogo (JP)

( * ) Notice: Subject to any disclaimer, the term of this patent is extended or adjusted under 35 U.S.C. 154(b) by 702 days.

This patent is subject to a terminal disclaimer.

(21) Appl. No.: 11/339,834

(22) Filed: Jan. 24, 2006

(65) Prior Publication Data

US 2006/0168605 A1 Jul. 27, 2006

(30) Foreign Application Priority Data

Jan. 24, 2005 (JP) ............................. 2005-015256
Dec. 28, 2005 (JP) ............................. 2005-379580

(51) Int. Cl.
*G11B 7/085* (2006.01)

(52) U.S. Cl. .................. 369/30.85; 369/30.52; 720/619

(58) Field of Classification Search .............. 369/30.52, 369/30.78, 30.55, 30.85, 30.89; 720/619, 720/620, 623
See application file for complete search history.

(56) References Cited

U.S. PATENT DOCUMENTS

| | | | | | |
|---|---|---|---|---|---|
| 5,335,218 | A | * | 8/1994 | Osada | 369/30.85 |
| 5,848,034 | A | * | 12/1998 | Morioka et al. | 369/30.89 |
| 5,872,748 | A | * | 2/1999 | Shindo et al. | 369/30.85 |
| 6,817,022 | B1 | * | 11/2004 | Taniguchi et al. | 720/623 |
| 6,996,835 | B1 | * | 2/2006 | Taniguchi et al. | 720/623 |
| 7,243,357 | B1 | * | 7/2007 | Taniguchi et al. | 720/623 |
| 2006/0168603 | A1 | * | 7/2006 | Goto | 720/619 |
| 2006/0168604 | A1 | * | 7/2006 | Koseki | 720/619 |

FOREIGN PATENT DOCUMENTS

JP   5-20765   1/1993

(Continued)

OTHER PUBLICATIONS

Patent Abstracts of Japan for Publication No. 05-020765; Date of publication of application Jan. 29, 1993, in the name of Hiroyuki Chigasalki.

(Continued)

*Primary Examiner*—Ali Neyzari
(74) *Attorney, Agent, or Firm*—Christie, Parker & Hale, LLP (57) ABSTRACT

A disc changer has a disc pushing device that can be accommodated within a limited space and can securely push out a disc from a disc accommodation section in a simple structure. The disc pushing device includes: a rotation axis fitted to a casing of the disc changer; a first lever section having a first lever with a small turning radius provided in projection on a cylindrical body having the rotation axis; and a second lever section having a base connected to a cylindrical body using the rotation axis, with a part of the base slidably superimposed on the upper part of the first lever section, and a turning radius of the front end larger than a turning radius of the first lever. A driving mechanism first turns the first lever section, and thereafter turns the second lever section, thereby pushing out a disc from the disc accommodation section.

16 Claims, 9 Drawing Sheets

FOREIGN PATENT DOCUMENTS

| | | |
|---|---|---|
| JP | 08-306114 | 11/1996 |
| JP | 8-321122 | 12/1996 |
| JP | 9-73702 | 3/1997 |
| JP | 10-69697 | 3/1998 |
| JP | 10-112155 | 4/1998 |
| JP | 2000-163845 | 6/2000 |
| JP | 2001-351302 | 12/2001 |

OTHER PUBLICATIONS

Patent Abstracts of Japan for Publication No. 08-321122; Date of publication of application Dec. 3, 1996, in the name of Kazuyoshi Hawiwara.

Patent Abstracts of Japan for Publication No. 09-073702; Date of publication of application Mar. 18, 1997, in the name of Kazuyoshi Hagiwara.

Patent Abstracts of Japan for Publication No. 10-069697; Date of publication of application Mar. 10, 1998, in the name of Shingo Kage et al.

Patent Abstracts of Japan, Publication No. 2001-351302; Date of Publication: Dec. 21, 2001; in the name of Takayuki Ishibashi.

Patent Abstracts of Japan, Publication No. 08-306114; dated Nov. 22, 1996; in the name of Nobuyuki Kubokawa.

Patent Abstracts of Japan, Publication No. 10-112155; dated Apr. 28, 1998, in the name of Yuji Yamaguchi et al.

Patent Abstracts of Japan, Publication No. 2000-163845; dated Jun. 16, 2000, in the name of Minoru Oikawa et al.

* cited by examiner

DISC CHANGER HAVING DISC PUSHING DEVICE

CROSS-REFERENCE TO RELATED APPLICATION

This application claims priority from, and incorporates by reference the entire disclosure of, Japanese Patent Applications (1) No. 2005-015256, filed on Jan. 24, 2005, and (2) No. 2005-379580, filed on Dec. 28, 2005.

BACKGROUND OF THE INVENTION

1. Field of the Invention

The present invention relates to a disc changer. Particularly, the invention relates to a disc changer incorporated in a disc drive unit, the disc changer incorporating plural discs in an accommodation section and being capable of exchanging an accommodated disc with an external disc. The disc changer has an improved disc pushing device that pushes a disc; accommodated in the accommodation section, from the disc changer to a disc discharge position.

2. Description of the Related Art

Conventionally, a cassette tape has been the mainstream medium recorded with music to provide music in a motor vehicle. However, a disc medium such as a compact disc (CD) and a mini disc (MD) is now mainly used in place of the cassette tape. Because the disc medium is thinner than the cassette tape and, particularly, because an optical disc like the CD is not in a case, a disc changer that accommodates plural discs in a reproducing unit and reproduces the recorded content by exchanging the discs is popular. A disc changer is also being developed for a digital versatile disc (DVD) type of optical disc.

This disc changer for optical discs has a disc accommodation section capable of separately accommodating plural discs, one by one, inside a casing. A swing arm takes out a desired one of the discs from this disc accommodation section, and reproduces the content of the disc using an optical head. When the reproduction ends, the swing arm returns the disc to the disc accommodation section. In general, a turntable on which a disc is rotated and a clamper that fixes the disc onto the turntable are provided at the front end of the swing arm. An optical head moves in a radial direction of the optical disk, on a moving path formed on the swing arm, on the disc that rotates on the turntable, thereby reproducing the information recorded on the disc. Generally, the disc changer has the disc accommodation section movably arranged, in the up and down directions, to facilitate the taking out of a desired disc from the disc accommodation section.

An early CD disc changer mounted on a motor vehicle was large in size, and was accommodated in a trunk of the motor vehicle. However, due to the increasingly compact size of the disc changer in recent years, the disc drive unit that incorporates the disc changer can be accommodated in a center console of an instrument panel of the motor vehicle.

The compact disc changer can accommodate plural discs in an accommodation section provided inside the disc drive unit, and can selectively reproduce the content of a desired one of the discs. The disc changer can also discharge each one of the discs to the outside of the disc drive unit, and exchange the disc with other disc. The disc changer can exchange a disc during the reproduction of the content of other disc.

Therefore, the disc changer has a disc discharge device that discharges a disc accommodated in the disc accommodation section to the outside of the disc drive unit. This disc discharge device generally has a pushing member that pushes a disc from the disc accommodation section to the disc discharge position, and a carrying mechanism that discharges the disc from the discharge position to the outside of the disc drive unit. The disc pushing member generally includes a turning lever that turns around a rotation axis to push out the disc. The carrying mechanism generally includes a roller that functions to send a disc to the inside of the disc drive unit when the disc is inserted into the disc drive unit. This roller is called a discharge roller.

However, as a result of the small disc changer in the disc drive unit, parts within the disc changer have little margin in size. Therefore, when the turning lever is used as a pushing member to push a disc from the disc accommodation section to the disc discharge position, there are problems that the turning lever collides against or is brought into contact with the disc accommodation section, with a result that the pushing member does not touch the disc and cannot push out the disc, because the height of the disc cannot match the height of the turning lever due to a variation in the size of parts. To overcome this difficulty, there is an attempt to provide a taper in the turning lever (or the accommodation member), taking into account the variation of the height of the parts in advance, and the turning lever is moved up and down, thereby absorbing a gap of heights. However, when the front end of the turning lever enters the gap of the accommodation section, the tapered turning lever often cannot absorb the height variation. When a root part of the turning lever near the rotation axis is to be brought into contact with the disc, a curvature of the turning lever becomes large, and the lever has a large length in a disc discharge direction. Consequently, the large lever cannot be accommodated in the disc drive unit.

SUMMARY OF THE INVENTION

It is an object of the present invention to provide a disc changer, for a disc drive unit and having a disc pushing device with a simple structure, capable of smoothly discharging a disc from a disc accommodation section to a disc discharge position, without the conventional problems of causing a disc pushing member to interrupt the accommodation section and fail in touching the disc, at the time of pushing the disc out from the disc accommodation section.

In order to achieve the above object, disc changers having a disc pushing device according to the following eleven aspects of the present invention are possible.

According to a first aspect of the invention, there is provided a disc changer for a disc drive unit, having at least: a disc accommodation section that accommodates plural discs and can be lifted up and moved down within the disc drive unit; a disc insertion/discharge mechanism that pulls in a disc inserted from a disc insertion opening to a predetermined position, and discharges a disc at a predetermined position to the disc insertion opening; and a disc pushing device having a discharge member that is positioned on the rear surface of the disc accommodation section, and discharges one disc from the disc accommodation section to the predetermined position. The disc pushing device includes: a rotation axis that is fitted to a casing of the disc changer; a first lever section including a cylindrical body using the rotation axis as a rotation center, and a first lever having a small turning radius provided in projection on the cylindrical body; a second lever section including a cylindrical body using the rotation axis as a rotation center, and a second lever of which the base is connected to the cylindrical body, a part of the base is slidably superimposed on the upper part of the first lever section, and a turning radius of the front end is larger than a turning radius of the first lever; and a driving mechanism of the first and the second lever sections. The driving mechanism carries out a first operation of rotating the first lever section to insert the first lever into the disc accommodation section, and a second operation of rotating the second lever section to insert the second lever into the disc accommodation section, at the time of discharging a disc from the disc accommodation section, thereby pushing the disc out from the disc accommodation section.

According to a second aspect of the invention, there is provided a disc changer having a disc pushing device for a disc drive unit according to the first aspect, wherein a tapered wedge part is provided in the first lever at the disc accommodation section side, toward a space between two racks of the disc accommodation section.

According to a third aspect of the invention, there is provided a disc changer having a disc pushing device for a disc drive unit according to the first or the second aspect, wherein a though-hole slidably engaged with the rotation axis is provided in the cylindrical body of the second lever section, and a though-hole slidably engaged with the rotation axis is provided in the cylindrical body of the first lever section.

According to a third aspect of the invention, there is provided a disc changer having a disc pushing device according to the third aspect, wherein a circumferential groove using the rotation axis as a center is provided at the base of the second lever, and a flange holding the base of the second lever, and a circumferential wall inserted in a circumferential groove provided in projection on the flange are provided at the upper end of the cylindrical body of the first lever section.

According to a fifth aspect of the invention, there is provided a disc changer having a disc pushing device for a disc drive unit according to the fourth aspect, wherein a tension spring is provided between the cylindrical body of the first lever section and the casing of the disc changer near the rotation axis, and the first lever is separated from the disc accommodation section.

According to a sixth aspect of the invention, there is provided a disc changer having a disc pushing device of the fifth aspect, wherein the first lever section and the second lever section can be moved in a moving direction of the disc accommodation section on the rotation axis, and when the wedge part of the first lever is brought into contact with the disc accommodation section before being inserted into the disc accommodation section, the first lever section and the second lever section move to a moving direction of the wedge part.

According to a seventh aspect of the invention, there is provided a disc changer having a disc pushing device for a disc drive unit according to any one of the first to the sixth aspects, wherein the driving mechanism of the first and the second lever sections includes an operation lever having an operation input unit and an operation output unit, the operation output unit has a guide groove for guiding the projection provided on the second lever, and the guide groove is formed to restrict the entering of the second lever into the disc accommodation section during the first operation of the first lever.

According to an eighth aspect of the invention, there is provided a disc changer for a disc drive unit, including: a disc accommodation section that accommodates plural disks; a disc pushing member that pushes out a disc accommodated in the disc accommodation section; and a discharging member that discharges the disc pushed out, by the pushing member, to a disc insertion opening, wherein the pushing member has a positioning member that positions the pushing member and the disc accommodation section, by being brought into contact with the disc accommodation section, before the pushing member is inserted into between two racks of the disc accommodation sections.

According to a ninth aspect of the invention, there is provided the disc changer for a disc drive unit according to the eighth aspect, wherein the pushing member and the positioning member are integrally and movably structured in a moving direction of the disc accommodation section, and the pushing member moves following the movement of the positioning member in a moving direction of the disc accommodation section when the positioning member is brought into contact with the disc accommodation section, thereby positioning the disc accommodation section and the pushing member.

According to a tenth aspect of the invention, there is provided a disc changer for a disc drive unit according to the eighth or the ninth aspect, wherein the pushing member and the positioning member are integrally formed.

According to an eleventh aspect of the invention, there is provided a disc changer for a disc drive unit according to the eighth or the ninth aspect, wherein the pushing member and the positioning member are in a two-body structure of which position is restricted in the moving direction of the disc accommodation section.

According to the disc changer having a disc pushing device for a disc drive unit according to the present invention, at the time of pushing out a disc from the disc accommodation section of the disc changer, the height of the disc to be pushed out by the disc pushing member is matched with the height of the disc accommodation section, in a simple structure. Therefore, the disc can be smoothly discharged from the disc accommodation section to the disc discharge position.

BRIEF DESCRIPTION OF THE DRAWINGS

The present invention is illustrated by way of example and not limitation in the figure of the accompanying drawings in which like references indicated similar elements. Note that the following figures are not necessarily drawn to scale.

DESCRIPTION OF THE PREFERRED EMBODIMENTS

Disc changers according to embodiments of the present invention are explained, in detail, below with reference to the accompanying drawings.

Figure 1:
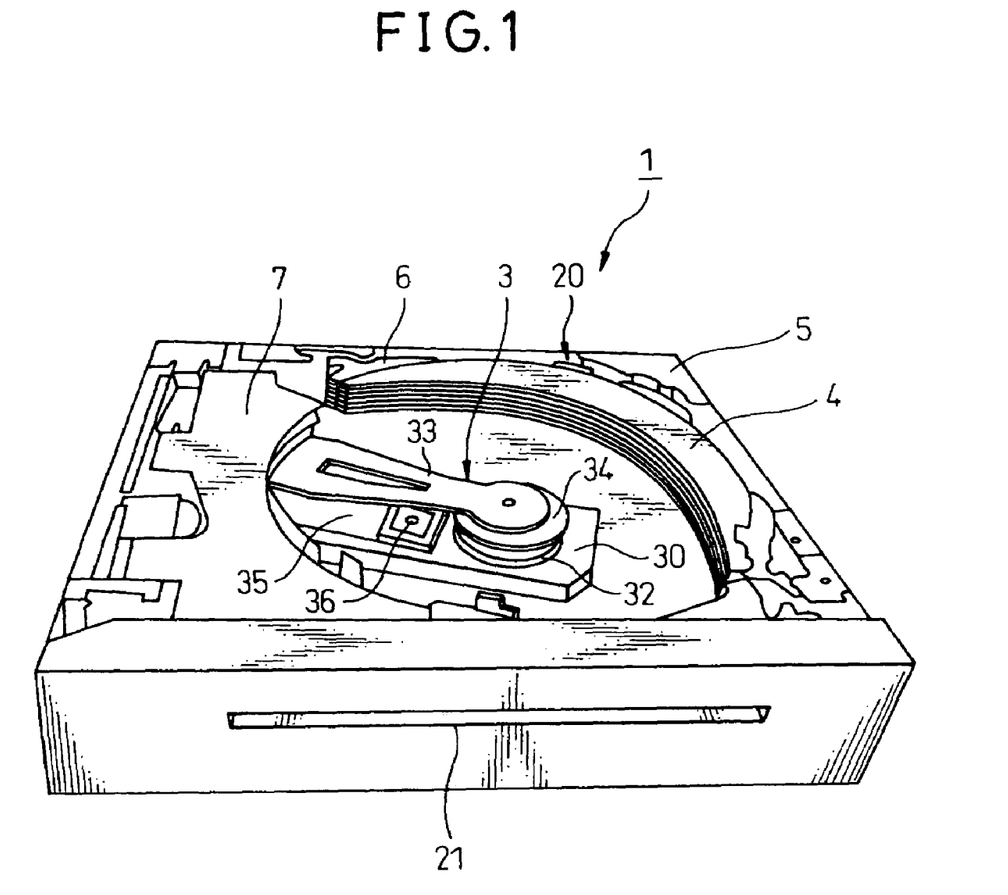
FIG. 1 is a perspective view of a configuration of a disc changer to which the present invention is applied.

FIG. 1 is a perspective view of a configuration of a disc changer 1 to which the present invention is applied, where a disc is not accommodated. The disc changer 1 to which the present invention is applied includes a stocker 4 as a disc accommodation section capable of accommodating plural discs and capable of being lifted up and moved down within the disc changer, a swing arm 3 that includes a disc damper 34 which that takes out a disc from the stocker 4, reproduces content of the disc, clamps the disc at the time of the reproduction, and returns the disc to the stocker 4 after the reproduction, a drive unit 7 of the swing arm 3, a linear position sensor (not shown) that detects a position of the stocker 4, and a lifting mechanism 5 that lifts up and moves down the stocker 4 based on an output of the linear position sensor.

The swing arm 3 is rotated by the drive unit 7, and broadly includes a frame 30 and a clamp arm 33. A turntable 32 on which a disc is rotated is provided at the front end of the frame 30. An optical head 36 and a moving path 35 on which the optical head 36 moves are provided at the center of the frame 30. A base of the clamp arm 33 is fitted to the upper part of the frame 30 with a rotating axis. A clamper 34 that clamps a disc is rotatably provided at the front end of the clamp arm 33. The front end of the clamp arm 33 rotates to the frame 30 side, and sandwiches and fixes a disc mounted onto the turntable 32 with the damper 34.

A position of the swing arm 3 in a vertical direction within the disc changer 1 is unchanged, and is constant. Therefore, in order to allow the swing arm 3 to clamp a desired one of the discs accommodated in the stocker 4, the stocker 4 is divided in a vertical direction and moves within the disc changer 1. The stocker 4 has one stocker base, and plural movable stockers as movable racks mounted on the stocker base. Each movable stocker can accommodate one disc. The stocker 4 moves up and down within the disc changer 1 based on the operation of the stocker lifting mechanism 5. In order to allow the swing arm 3 to take out a desired one of discs held in the stocker 4, the movable stockers constituting the stocker 4 can be divided into up and down positions at a desired position by a stocker dividing mechanism 6.

A disc pushing mechanism 20 that pushes one disc accommodated in the stocker 4 is provided within the casing of the disc changer at a rear surface side of the stocker 4 having the plural movable stockers. The height of the disc pushing mechanism 20 from the bottom surface of the disc changer 1 is fixed. The disc pushing mechanism 20 pushes a disc within a movable stocker 4 at a predetermined position, based on the move of the stocker 4 in the up and down directions, thereby discharging the disc to the outside from a disc insertion/discharge opening of the disc changer 1.

Figure 2:
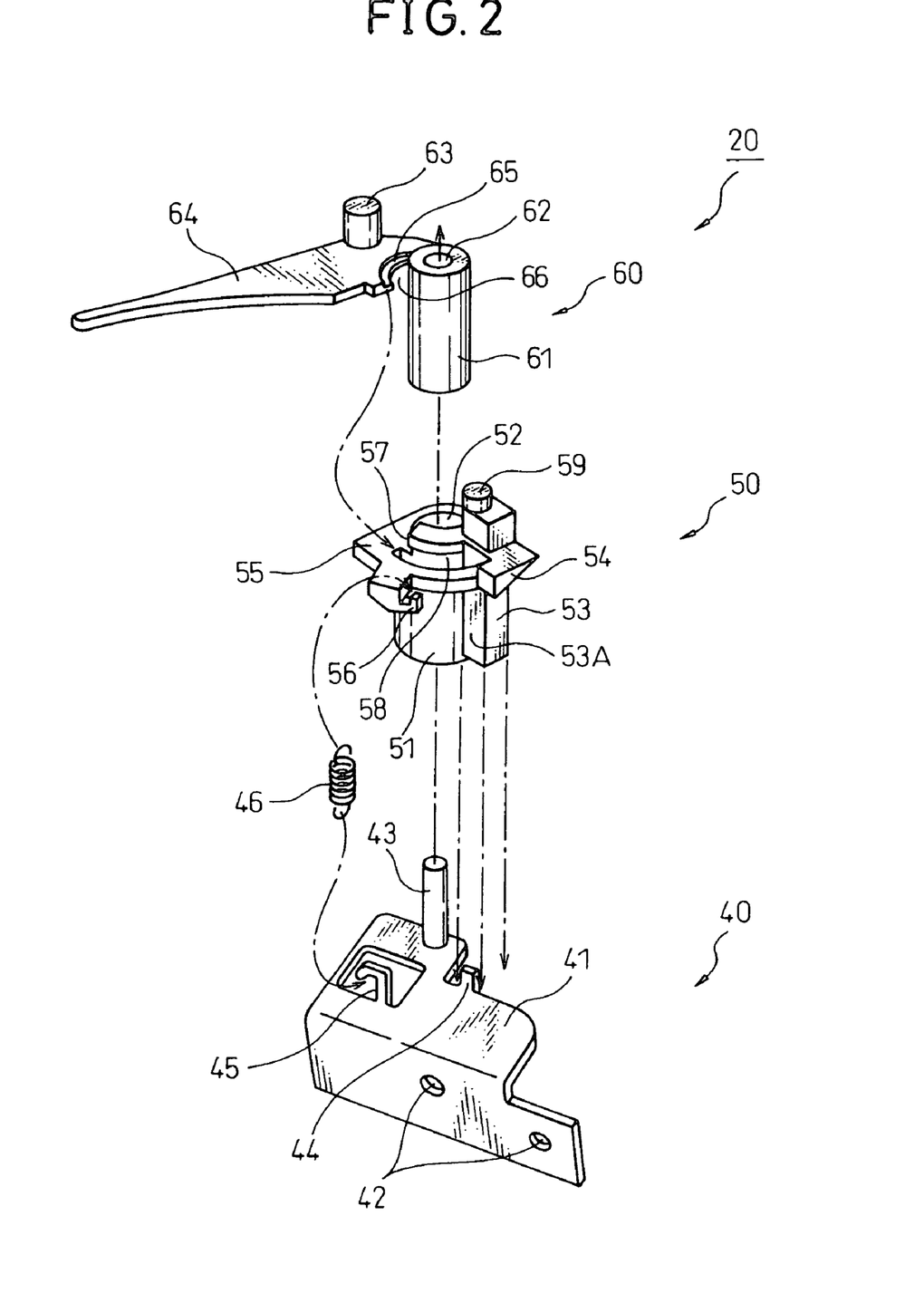
FIG. 2 is an assembly perspective view of a configuration of a disc pushing mechanism of a disc pushing device according to the present invention.
Figure 3A:
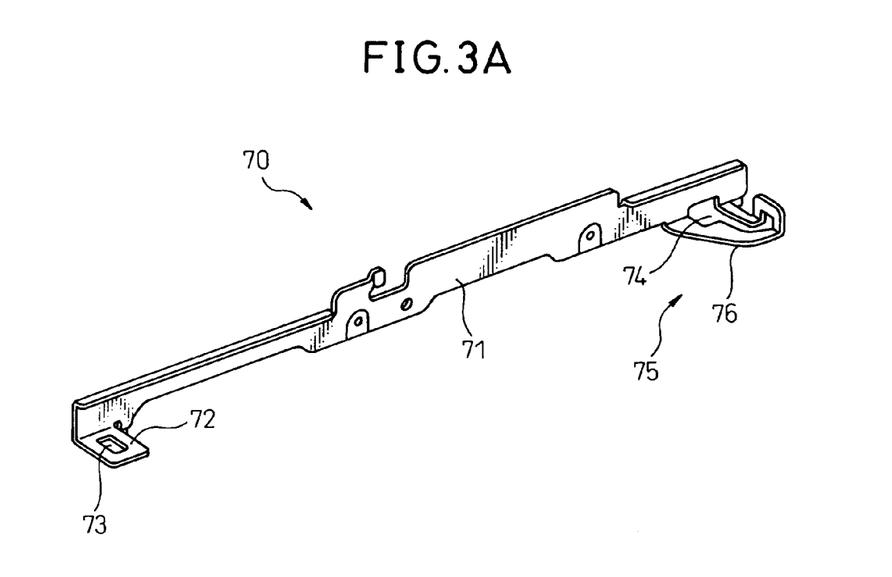
FIG. 3A is a perspective view of an operation lever of the disc pushing device that operates the disc pushing mechanism shown in FIG. 2.
Figure 3B:
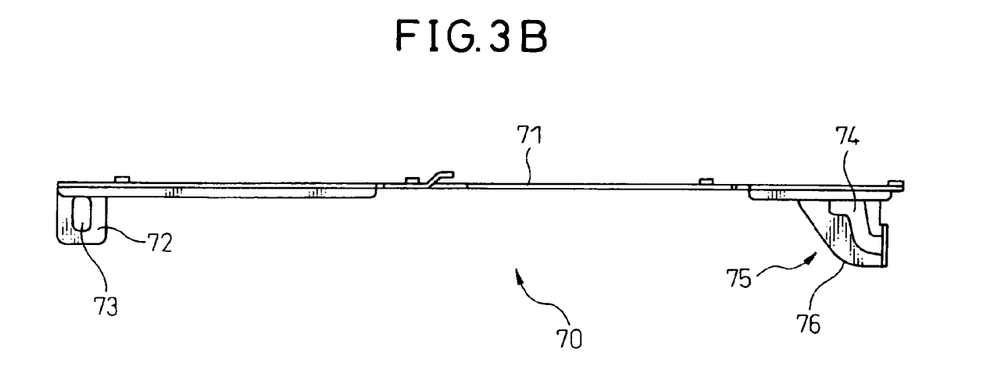
FIG. 3B is a top plan view of the operation lever shown in FIG. 3A.

FIG. 2 is an assembly perspective view of a configuration of the disc pushing mechanism 20 of the disc pushing device according to the present invention. The disc pushing mechanism 20 according to the present embodiment includes a mounting member 40, a first lever 50, and a second lever 60. The disc pushing device according to the present invention includes the disc pushing mechanism 20 and an operation lever 70 explained with reference to FIG. 3.

The mounting member. 40 has an L-shaped mounting tab 41. The mounting tab 41 is fixed to a predetermined position of a casing of the disc changer, with a screw that passes through mounting holes 42. On the surface of the mounting tab 41 parallel with the bottom surface of the casing of the disc changer, there are disposed a mounting axis 43 that becomes a rotation axis of the disc pushing mechanism 20, a stopper 44 that stops the turning of the first lever, and a spring-mounting hook 45. One end of a tension spring 46 is engaged with the spring-mounting hook 45.

A configuration of the second lever 60 is explained before explaining a configuration of the first lever 50. The second lever 60 includes a cylindrical sleeve 61, and a plate-shaped pushing lever 64 as the second lever. The sleeve 61 has a through-hole 62. A mounting axis 43 of the mounting member 40 is passed through the through-hole 62 so that the second lever 60 becomes rotatable. The sleeve 61 has approximately the same length as that of the mounting axis 43. The base of the pushing lever 64 is connected to an end surface of the sleeve 61 far from the mounting member 40. The pushing lever 64 has a smaller width toward the front end, and the disc-pushing side of the pushing lever 64 is curved to match the external shape of a disc. A cylindrical operation projection 63 for controlling the operation of the pushing lever 64 is provided on the upper surface of the pushing lever 64. A circumferential guide groove 66 along the external peripheral part of the sleeve 61 is provided on the base of the pushing lever 64. A staged part 65 having a uniform width of stages is provided on the pushing lever 64 at the external periphery of the guide groove 66.

On the other hand, the first lever 50 includes a cylindrical body 51 having a through-hole 52 through which the sleeve 61 of the second lever is passed, a stopper projection 53 provided on the side surface of the cylindrical body 51 in the direction of the axis line, a wedge lever 54 as the first lever provided on the external surface of the stopper projection 53, a first flange 55 provided on the upper end of the cylindrical body 51, an extension part 58 of the cylindrical body provided on the first flange 55 adjacent to the stopper projection 53, and a second flange 57 provided at the end of the extension part 58. A spring mounting hook 56 is provided on the external periphery of the first flange 55. A cylindrical operation projection 59 is provided on the end surface of the stopper projection 53 at the opposite side of the mounting tab 41. The operation projection 59 is engaged with the operation lever 70 explained later.

The second lever 60 has the sleeve 61 rotated in the state that the sleeve 61 is passed through the through-hole 52 of the first lever 50, so that the guide groove 66 is inserted into the extension part 58 of the cylindrical body of the first lever 50. As a result, the staged part 65 adjacent to the guide groove 66 is engaged with the second flange 57. The extension part 58 of the cylindrical body is positioned between the first flange 55 and the second flange 57, and becomes a guide groove that receives the staged part 65 of the second lever 60. In the state that the second lever 60 is fitted to the first lever 50, the pushing lever 64 of the second lever 60 is supported by the first flange 55 of the first lever 50, and slides on the first flange 55.

After the second lever 60 is combined with the first lever 50, the mounting axis 43 is passed through the through-hole 62 of the sleeve 61, so that the second lever 60 is mounted to the mounting member 40. In this case, the mounting axis 43 is passed through the through-hole 62 of the sleeve 61 so that a surface 53A of the stopper projection 53 of the first lever 50 at the side of the casing of the disc changer is brought into contact with the stopper 44 of the mounting part 40.

After the mounting axis 43 is passed through the first lever 50 and the second lever 60 respectively, a tension spring 46 is hooked between the spring-mounting hook 45 of the mounting member 40 and the spring-mounting hook 56 of the first lever 50. Based on the tension spring 46, the first lever 50 is biased to the top surface of the L-shaped mounting tab 41, and the surface 53A of the stopper projection 53 at the side of the casing of the disc changer is brought into contact with the stopper 44. In the above configuration, the disc pushing mechanism 20 moves in vertical directions of the mounting axis 43, thereby matching the height of the pushing lever 64 with the position of the space between racks of the stocker. The operation is explained later.

FIG. 3A and FIG. 3B are perspective views of the operation lever 70 of the disc pushing device that operates the disc pushing mechanism 20 shown in FIG. 2. The operation lever 70 includes a flat slender main body 71, and an operation input unit 72 and an operation output unit 75 that are bent in directions orthogonal to the main body 71 at both ends of the main body 71 respectively. The operation input unit 72 has a through-hole 73 that is connected to a driving mechanism not shown. When the operation input unit 72 is pulled by the driving mechanism, the main body 71 moves, and the operation output unit 75 operates. The operation projection 63 provided on the pushing lever 64 explained with reference to FIG. 2 is inserted into a guide groove 74 formed in the operation output unit 75. The guide groove 74 is formed in a shape to prevent the second lever 60 from moving following the movement of the first lever 50 during the operation of the first lever 50. Further, the end of the operation output unit 75 at the side of the operation input unit 72 becomes a cam 76 that is engaged with the operation projection 59 explained with reference to FIG. 2.

Figures 4A, 4B:
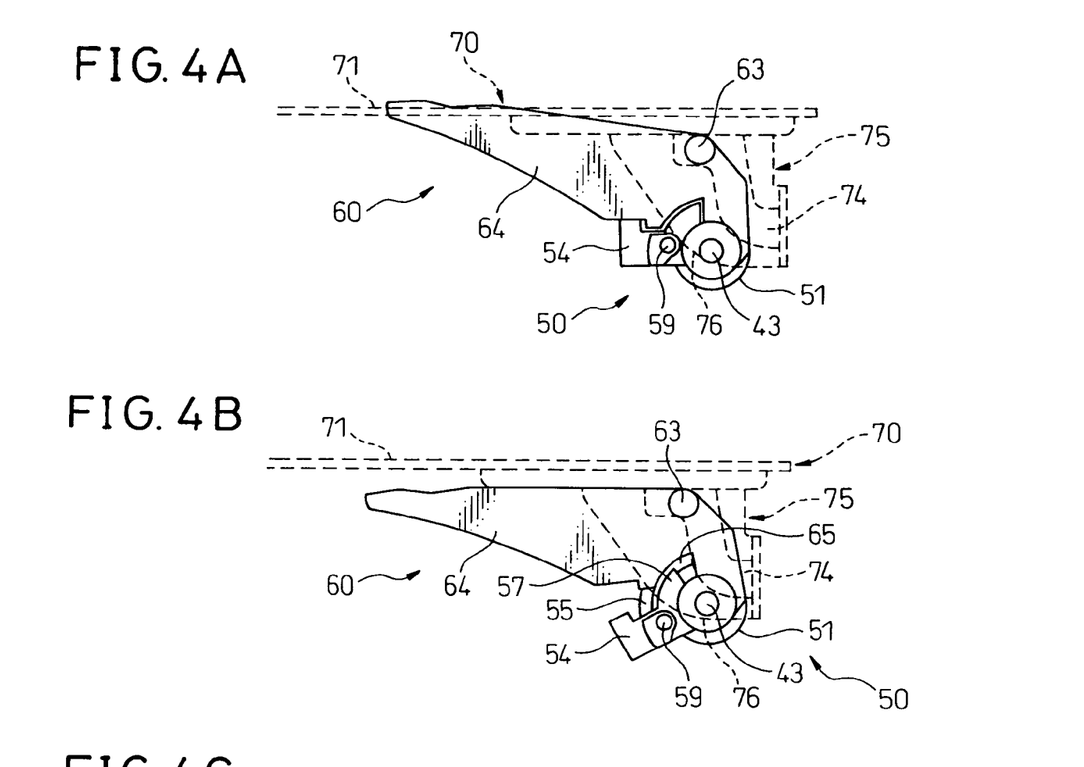
FIG. 4A to FIG. 4C are top plan views showing the operation of the disc pushing mechanism shown in FIG. 2.
Figure 4C:
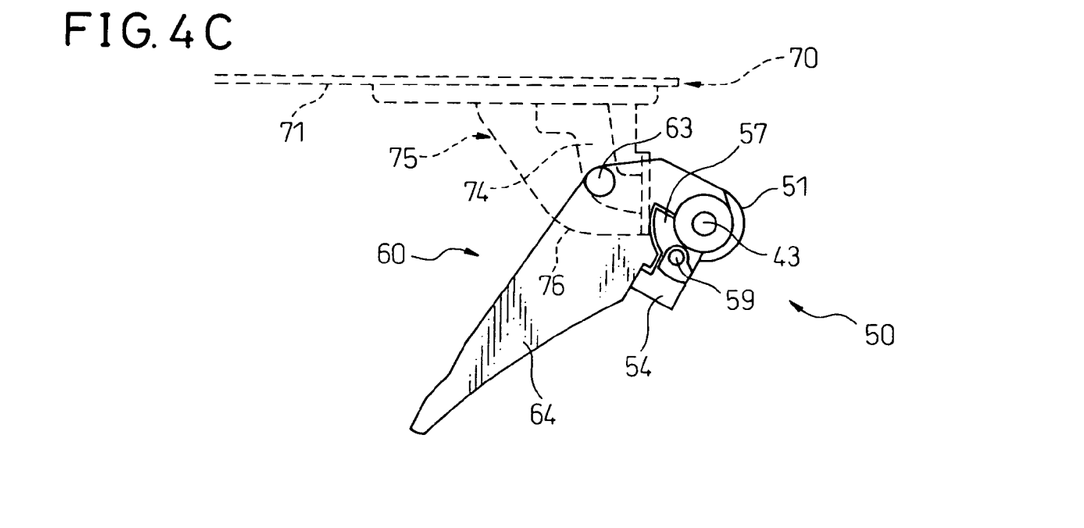

FIG. 4A to FIG. 4C are top plan views showing the operation of the disc pushing mechanism 20 shown in FIG. 2, in relation to the operation lever 70 (indicated by a broken line) shown in FIG. 3A and FIG. 3B. FIG. 4A shows a state that the operation lever 70 has moved to the right-most end in the drawing, and the operation lever 70 does not move to the right any more. In this state, the operation projection 59 of the first lever 50 is in contact with the cam 76 of the operation output unit 75 of the operation lever 70, and the operation projection 63 of the second lever 50 is within the guide groove 74 of the operation output unit 75. In this state, the wedge lever 54 of the first lever 50 and the pushing lever 64 of the second lever 60 are not rotating.

FIG. 4B shows a state that the operation lever 70 has slightly moved to the left from the state shown in FIG. 4A. In this state, the operation projection 59 of the first lever 50 moves along the shape of the cam 76 of the operation output unit 75 of the operation lever 70, and the wedge lever 54 of the first lever 50 is rotated accordingly. While the pushing lever 64 of the second lever 60 also attempts to turn in the same direction following the turning of the first lever 50, the guide groove 74 interrupts the turning of the operation projection 63 of the second lever 50 within the guide groove 74 of the operation output unit 75. As a result, only the wedge lever 54 of the first lever 50 turns.

FIG. 4C shows a state that the operation lever 70 has further moved to the left from the state shown in FIG. 4B. In this state, the operation projection 59 of the first lever 50 is disengaged from the cam 76 of the operation output unit 75 of the operation lever 70, and the operation projection 63 of the second lever 60 within the guide groove 74 of the operation output unit 75 moves along the shape of the guide groove 74. As a result, the pushing lever 64 of the second lever 60 turns by a large angle. At this time, the base of the pushing lever 64 of the second lever 60 turns by being held by the first flange 55 of the first lever 50 that turned earlier. Therefore, the turn is stable, and the front end of the pushing lever 64 does not fluctuate. The pushing lever 64 of the second lever 60 reaches the wedge lever 54 of the first lever 50 after turning by a certain angle. Thereafter, the pushing lever 64 turns together with the wedge lever 54 of the first lever 50.

The operation of the disc pushing device according to the embodiment is explained next together with the operation of the disc 2 of the disc changer 1, the stocker 4 that accommodates the disc 2, and the driving mechanism 80 of the operation lever 70, with reference to FIG. 5A to FIG. 8D. FIG. 5A to FIG. 7 are top plan views of the disc 2, the stocker 4, the wedge lever 54, the pushing lever 64, and the driving mechanism 80 of the operation lever 70. FIG. 8A to FIG. 8D are cross-sectional side views of the operation of the stocker 4, the wedge lever 54, and the pushing lever 64.

Figure 5A:
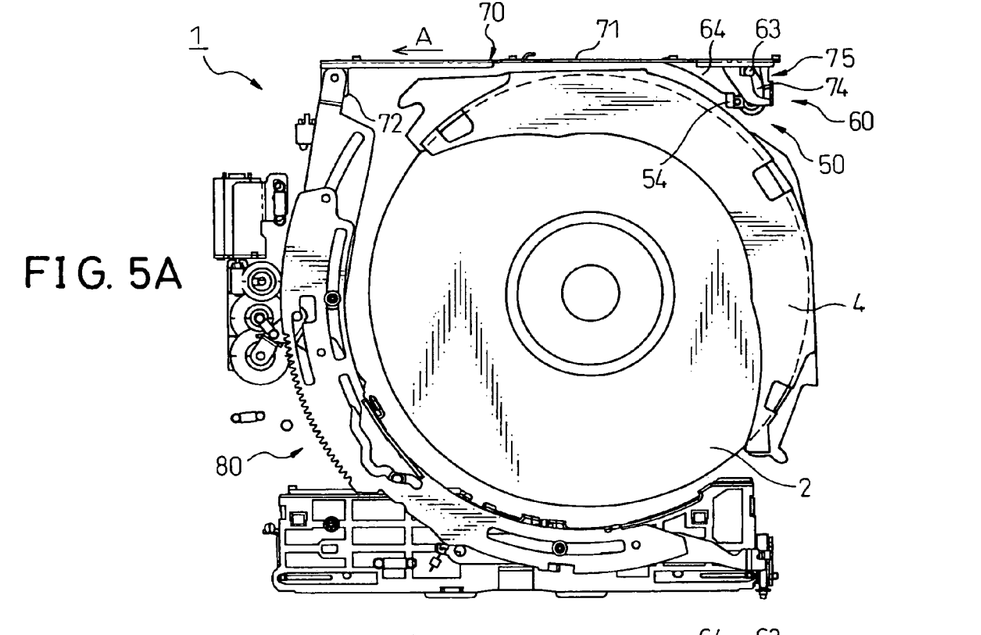
FIG. 5A is a top plan view of a relevant part of the disc exchanger showing a state before the disc changer starts a disc push operation in the operation carried out by the disc pushing device according to the present invention.
Figure 8A:
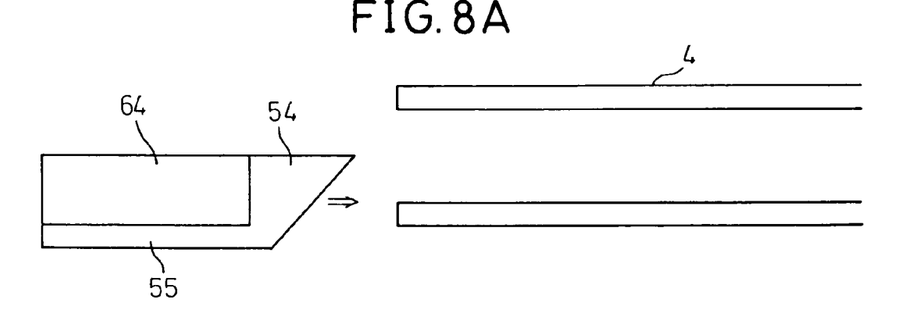
FIG. 8A is an enlarged cross-sectional view of a relevant part of the first and the second levers before these levers start operation according to the present invention.

FIG. 5A shows a state before the disc changer 1 starts a disc push operation, and the disc pushing device is in the same state as that shown in FIG. 4A. The operation input unit 72 of the operation lever 70 is connected to the driving mechanism 80. Based on the operation of the driving mechanism 80, the operation lever 70 is pulled to a direction of an arrowhead A in the drawing, and is returned to a direction opposite to the direction of the arrowhead A. In this state, the wedge lever 54 of the first lever 50 and the pushing lever 64 of the second lever 60 are positioned at the outside of the stocker 4 that accommodates the disc 2. Therefore, in this state, the wedge lever 54 and the pushing lever 64 do not interrupt the lifting up and moving down of the stocker 4. In this case, it is assumed that the position of the space between movable stockers of the stocker 4 is deviated from the positions of the wedge lever 54 and the pushing lever 64 as shown in FIG. 8A.

Figure 5B:
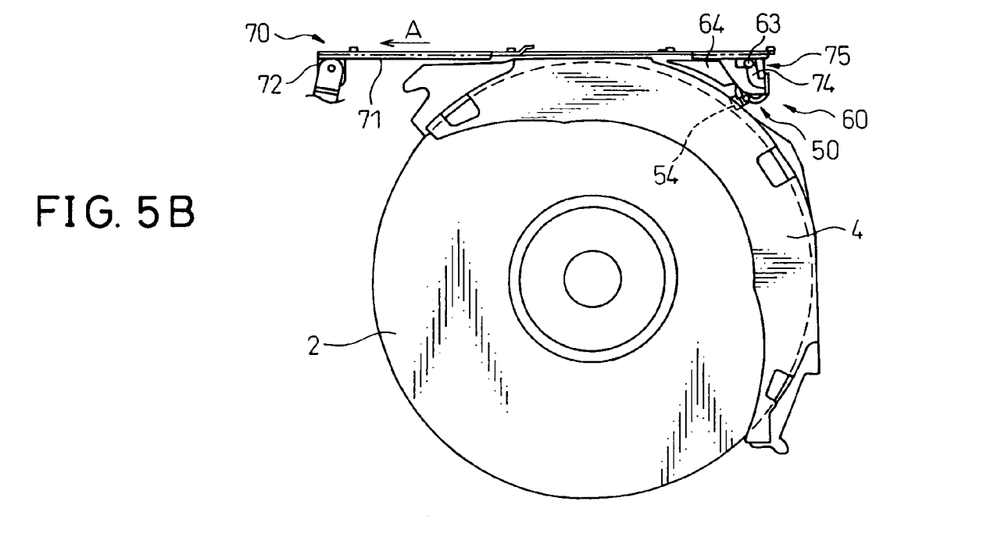
FIG. 5B is a top plan view of a relevant part of the disc exchanger showing the operation of a first lever.

FIG. 5B shows a state that the operation lever 70 has slightly moved to the direction of the arrowhead A from the position shown in FIG. 5A. The disc pushing device is in the same state as that shown in FIG. 4B. In this state, only the wedge lever 54 of the first lever 50 is turned, and the wedge lever 54 is inserted into the space between a movable stocker that holds the disc 2 to be discharged and a movable stocker below the movable stocker holding the disc 2, thereby positioning the two movable stockers.

Figure 8B:
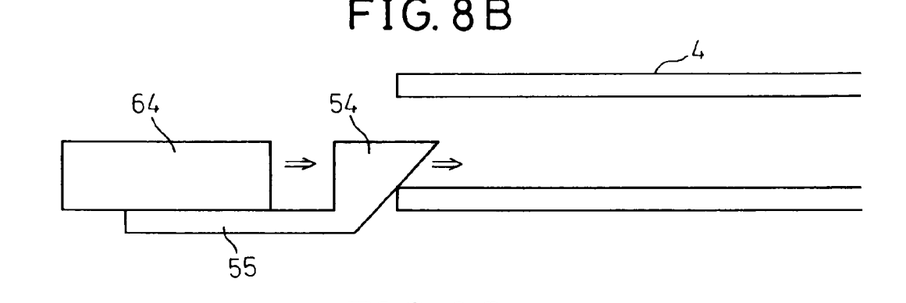
FIG. 8B is an enlarged cross-sectional view of a relevant part of the first and the second levers showing a state that the first lever is brought into contact with the end of a stocker by moving earlier than the second lever.
Figure 8C:
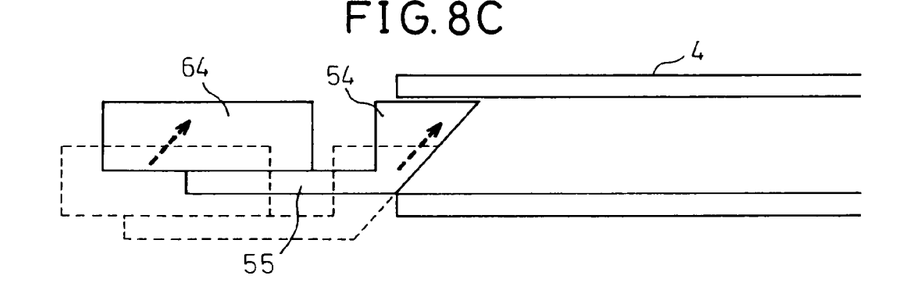
FIG. 8C is an enlarged cross-sectional view of a relevant part of the first and the second levers showing a state that the first lever is lifted up, with the second lever, to a position of a space between two racks of the stocker, while the first lever is moving.

Because the wedge lever 54 has a tapered wedge shape, the front end of the wedge lever 54 is inserted into between the two movable stockers, even when the position of the space between the movable stockers of the stocker 4 is deviated from the positions of the wedge lever 54 and the pushing lever 64 as shown in FIG. 8B. In this state, the wedge lever 54 is brought into contact with the end of the movable stocker. The pushing lever 64 of the second lever 60 is positioned at the outside of the stocker 4 that accommodates the disc 2.

When the wedge lever 54 turns further from the state shown in FIG. 8B, the wedge lever 54 moves in an inclined direction along the tapered surface of the wedge lever 54, and is inserted into the space between the two movable stockers. In this case, the pushing lever 64 is supported by the first flange 55 of the wedge lever 51 as explained above. Therefore, the pushing lever 64 rises together with the rise of the wedge lever 54. When the wedge lever 54 is further turned, the pushing lever 64 slides on the first flange 55, and reaches the wedge lever 54. Therefore, the pushing lever 64 is securely inserted into the space between the two movable stockers.

Figure 6A:
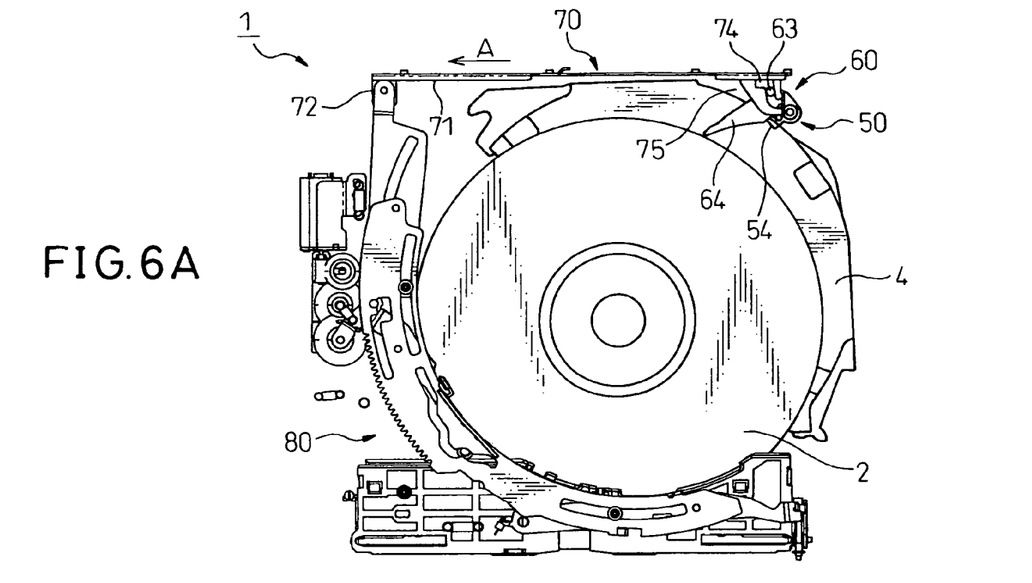
FIG. 6A is a top plan view of a relevant part of the disc exchanger showing a disc push operation of a second lever in the operation carried out by the disc pushing device according to the present invention.
Figure 8D:
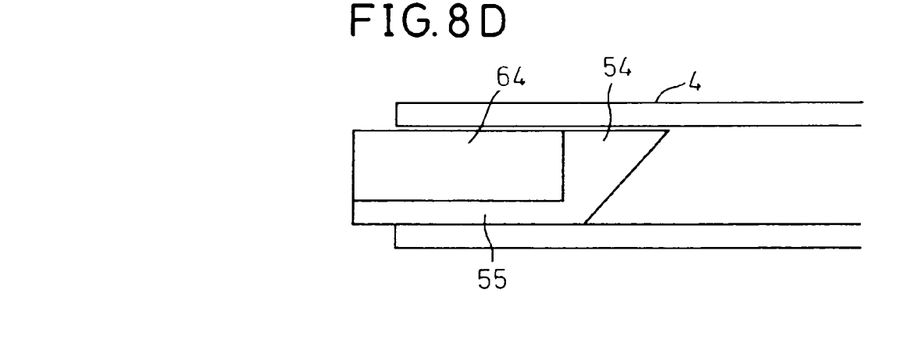
FIG. 8D is an enlarged cross-sectional view of a relevant part of the first and the second levers showing a state that both the first and the second levers are inserted into the space between the two racks of the stocker, after the second lever reached the first lever.

FIG. 6A shows a state that the operation lever 70 has further moved to the direction of the arrowhead A from the state shown in FIG. 5B. The disc pushing device is in an intermediate state between the state shown in FIG. 4B and the state shown in FIG. 4C. In FIG. 6A, parts positioned above the pushing lever 64 of the stocker 4 shown in FIG. 5B are omitted. In this state, the pushing lever 64 of the second lever 60 is turned, following the wedge lever 54 of the first lever 50, and is inserted into the space between the movable stocker secured by the wedge lever 54 and the movable stocker below this movable stocker, thereby pushing out the disc 2 held by the upper movable stocker, as shown in FIG. 8D. As described above, the pushing lever 64 of the second lever 60 is turned together with the wedge lever 54 of the first lever 50, when the pushing lever 64 reaches the wedge lever 54.

Figure 6B:
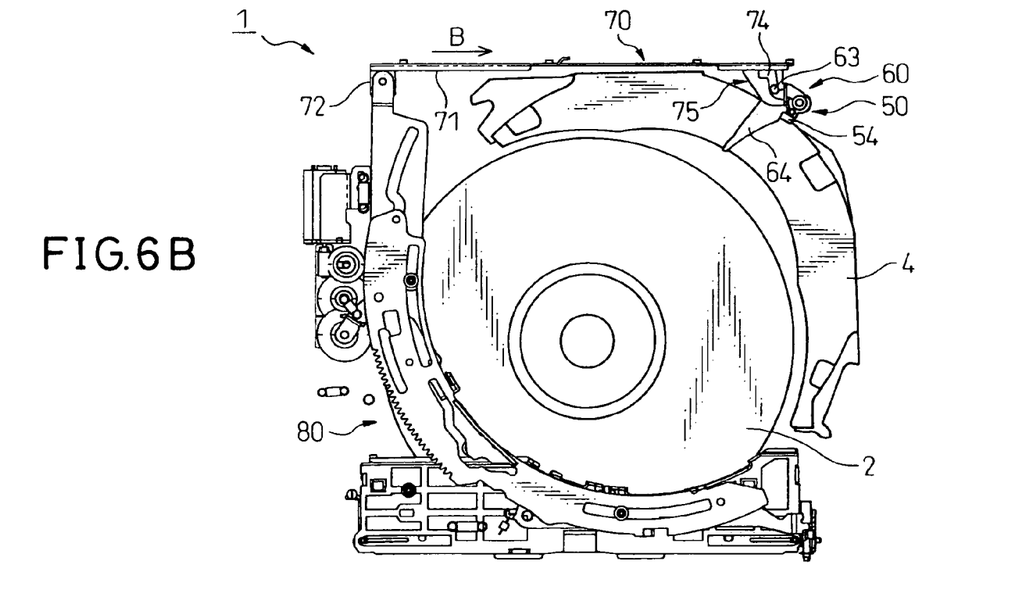
FIG. 6B is a top plan view of a relevant part of the disc exchanger showing a state that a disc reaches a discharge position by the disc push operation carried out by the second lever.

FIG. 6B shows a state that the operation lever 70 has further moved to the direction of the arrowhead A from the position shown in FIG. 6A. The disc pushing device is in the same state as that shown in FIG. 4C. FIG. 6B shows a state that the pushing lever 64 is completely turned. In this state, the disc 2 held by the movable stocker is completely pushed out from the stocker 4, and reaches the disc discharge position. Thereafter, the operation lever 70 is moved to a direction indicated by an arrowhead B, and returns to the position shown in FIG. 5A.

Figure 7:
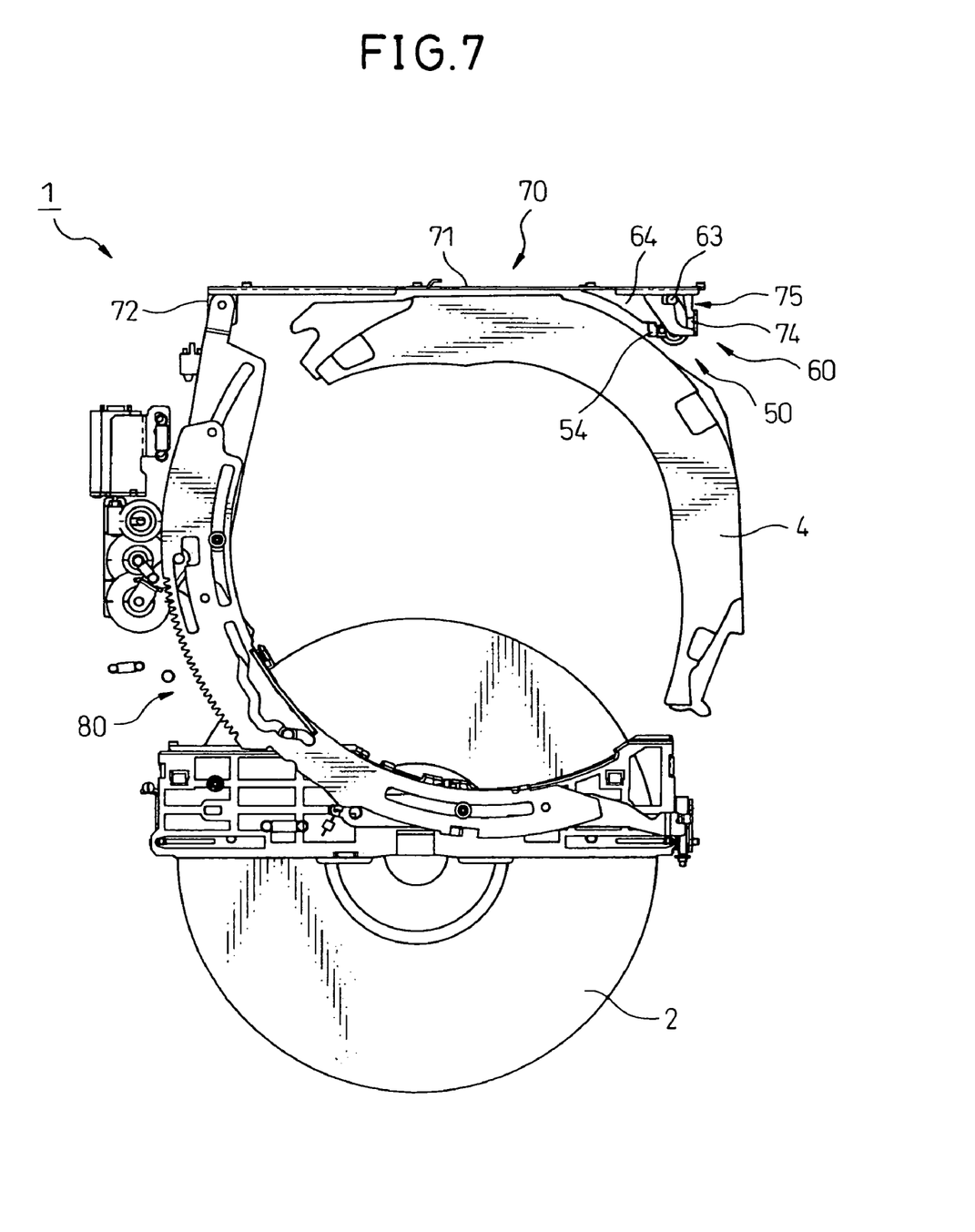
FIG. 7 is a top plan view of a relevant part of the disc exchanger showing a state that a disc discharge mechanism has discharged a disc after the disc reaches the discharge position by the disc push operation carried out by the second lever.

FIG. 7 shows a state that the disc 2 that is inserted in the space between the two movable stockers is completely pushed out from the stocker 4, and the disc 2 has reached the discharge position of the disc 2. When the disc 2 reaches the discharge position, the discharge mechanism (i.e., a discharge roller) not shown discharges the disc 2 to a position exposed at the outside of the disc changer 1, via the disc insertion/discharge opening 21 shown in FIG. 1. In this state, the disc 2 can be easily taken out from the outside of the disc changer 1.

As is clear from the operation explained in the above embodiment, according to the disc pushing device of the disc changer according to the present invention, at the time of discharging a disc held in the stocker 4, the first lever 50 is turned to position the movable stocker in which the disc 2 to be discharged by the wedge lever 54 having a small rotation radius is accommodated, before operating the second lever 60 having a large rotation radius. In the state that the base of the pushing lever 64 of the second lever is held in the first lever 50, the pushing lever 64 can be inserted into the discharge space of the movable stocker that holds the disc 2 to be discharged. Therefore, the pushing lever 64 of the second lever having the large rotation radius can be securely inserted into the stocker 4, and the disc 2 can be safely and securely discharged.

The shape of the first lever and the shape of the second lever of the pushing device of the disc changer according to the present invention are not limited to those explained in the present embodiment, so long as these shapes are formed to be able to carry out the following operation. At the time of discharging the disc, the first lever is turned first. The wedge part of the first lever is inserted into the space between movable stockers of the stocker. When the height of the first lever is deviated from the height of the space, the height of the first lever is matched with the height of the space between the two movable stockers of the stocker, by turning the first lever. Then, the second lever is turned.

In the above embodiment, it is explained that the first lever and the second lever are independent, and that the first lever starts operating before the second lever. Alternatively, the pushing member and the wedge positioning member can be integrally formed, by forming a wedge positioning projection on the base near the rotation axis of the second lever pushing member. This is explained below with reference to FIG. 9A and FIG. 9B.

Figure 9A:
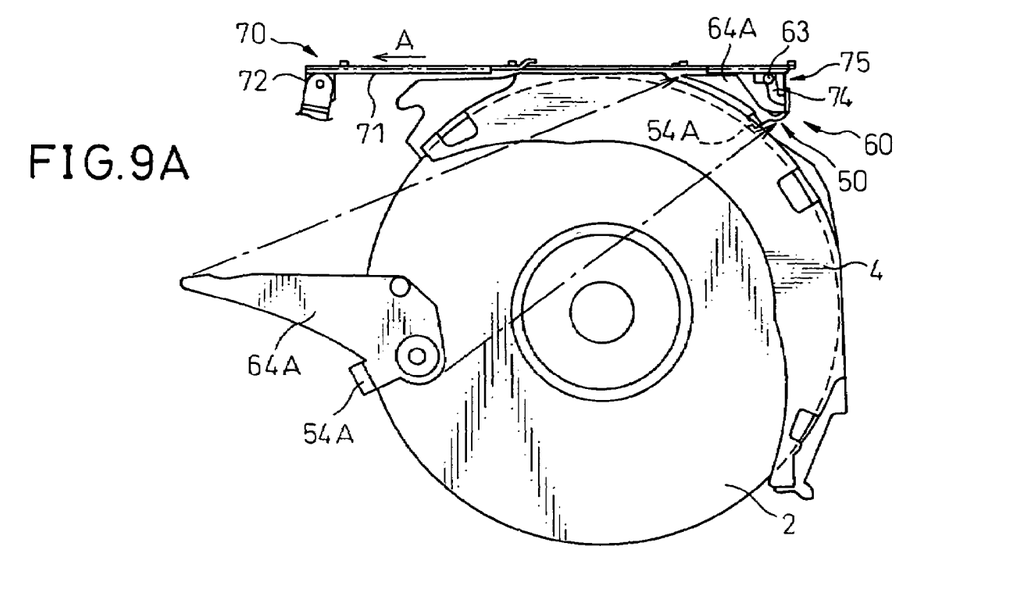
FIG. 9A is a top plan view of a relevant part of the disc exchanger showing the same state as that shown in FIG. 5B when an integrated disc pushing lever is used.

FIG. 9A shows an embodiment that the operation lever 70 is used to drive a disc pushing lever 64A that has the wedge lever 54 and the pushing lever 64, explained with reference to FIG. 4A to FIG. 4C, integrated together. A wedge 54A is provided at the same position as that of the wedge lever 54, in the disc pushing lever 64A.

FIG. 9A shows the same state as that shown in FIG. 5B, i.e., the operation lever 70 has slightly moved to the direction of the arrowhead A. In this state, the front end of the disc pushing lever 64A at the outside of the stocker 4. Only the wedge 54A is inserted into the space between the movable stocker that holds the disc 2 to be discharged and the movable stocker below the movable stocker holding the disc 2, thereby positioning the two movable stockers. When the disc pushing lever 64A is further turned to the stocker side, the front end of the disc pushing lever 64A enters the stocker 4, thereby pushing the disc 2 within the stocker 4 (not shown).

Figure 9B:
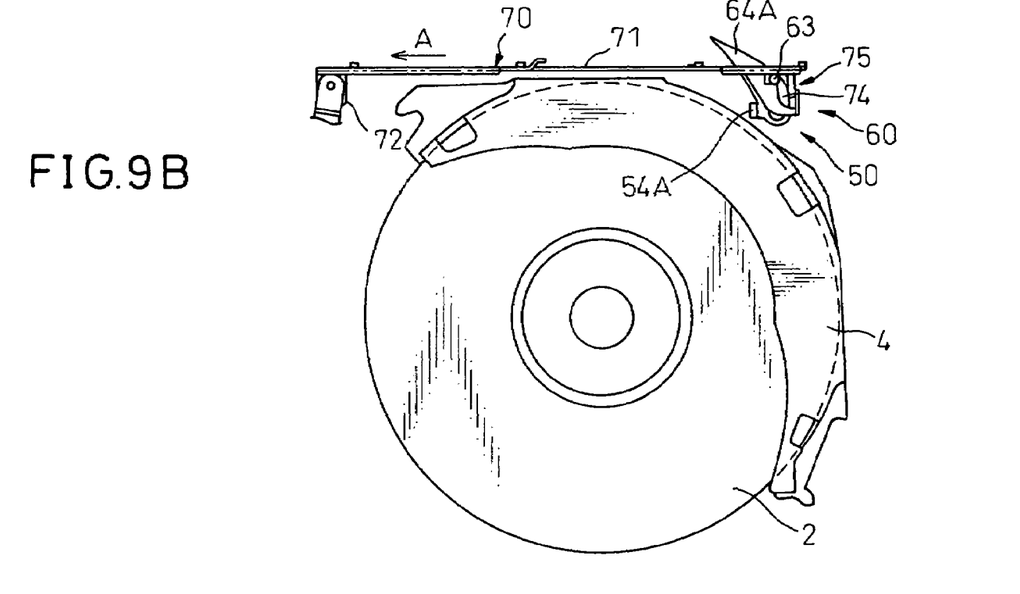
FIG. 9B is a top plan view of a relevant part of the disc exchanger showing the same state as that shown in FIG. 5A when the integrated disc pushing lever shown in FIG. 9A is returned to the state before starting the pushing operation.

FIG. 9B shows the same state as that shown in FIG. 5A when the integrated disc pushing lever 64A shown in FIG. 9A is returned to the state before starting the pushing operation. In this state, the wedge 54A of the disc pushing lever 64A is at the outside of the stocker 4, and does not interrupt the lifting up and the moving down of the stocker 4.

When the wedge lever 54 and the pushing lever 64 explained with reference to FIG. 4A to FIG. 4C are integrated together to form the disc pushing lever 64A, and when this disc pushing lever 64A is used, the form of the lever can be simplified and the drive mechanism can be simplified. Therefore, the cost of the disc drive unit can be decreased.

Although only some exemplary embodiments of this invention have been described in detail above, those skilled in the art will readily appreciate that many modifications are possible in the exemplary embodiments without materially departing from the novel teaching and advantages of this invention. Accordingly, all modifications are intended to be included within the scope of this invention.

What is claimed is:

1. A disc changer for a disc drive unit comprising:
   a disc accommodation section that accommodates a plurality of discs and is configured to be capable of being lifted up and moved down within the disc drive unit;
   a disc insertion/discharge mechanism that inserts and discharges a disc at a predetermined position between a disc insertion opening and the disc drive unit; and
   a disc pushing device having a discharge member that discharges one disc from the disc accommodation section to the predetermined position, wherein the disc pushing device comprises:

a rotation axis that is fitted to a casing of the disc changer;

a first lever section including a cylindrical body using the rotation axis as its rotation center, and a first lever having a turning radius projected from the cylindrical body;

a second lever section including a cylindrical body using the rotation axis as its rotation center, and a second lever having a base connected to the cylindrical body, a portion of the base slidably superimposed on an upper part of the first lever section, and a turning radius, a front end of which is larger than the turning radius of the first lever; and a driving mechanism of the first and the second lever sections, wherein the driving mechanism is configured to rotate the first lever section to insert the first lever into the disc accommodation section, and to rotate the second lever section to insert the second lever into the disc accommodation section, at the time of discharging a disc from the disc accommodation section to push out the disc from the disc accommodation section.

2. The disc changer according to claim 1, further comprising a tapered wedge part provided in the first lever at a disc accommodation section side and toward a space between two racks of the disc accommodation section.

3. The disc changer according to claim 1, wherein a first through-hole slidably engaged with the rotation axis is provided in the cylindrical body of the second lever section, and a second through-hole slidably engaged with the rotation axis is provided in the cylindrical body of the first lever section.

4. The disc changer according to claim 3, further comprising a circumferential groove using the rotation axis as its center is provided at the base of the second lever, a flange that holds the base of the second lever, and a circumferential wall that is inserted in the circumferential groove provided in projection on the flange, wherein the flange and the circumferential wall are provided at an upper end of the cylindrical body of the first lever section.

5. The disc changer according to claim 4, further comprising a tension spring provided between the cylindrical body of the first lever section and the casing of the disc changer near the rotation axis, wherein the first lever is separated from the disc accommodation section.

6. The disc changer according to claim 5, wherein the first lever section and the second lever section are configurable to be moved in a moving direction of the disc accommodation section on the rotation axis, and when the wedge part of the first lever is brought into contact with the disc accommodation section before being inserted into the disc accommodation section, the first lever section and the second lever section move to a moving direction of the wedge part.

7. The disc changer according to claim 1, wherein each of the driving mechanisms of the first and the second lever sections includes an operation lever having an operation input unit and an operation output unit, the operation output unit having a guide groove for guiding a projection provided on the second lever, wherein the guide groove is configured to restrict an entering of the second lever into the disc accommodation section during the rotation of the first lever.

8. A disc changer for a disc drive unit comprising:

a disc accommodation section that accommodates a plurality of disks;

a disc pushing member that pushes out a disc accommodated in the disc accommodation section; and a discharging member that discharges the disc pushed out by the disc pushing member to a disc insertion opening, wherein the disc pushing member has a positioning member that positions the disc pushing member and the disc accommodation section by being brought into contact with the disc accommodation section, before the disc pushing member is inserted between two racks of the disc accommodation sections, wherein the disc pushing member and the positioning member are integrally and movably structured in a moving direction of the disc accommodation section, and wherein the disc pushing member moves following a move of the positioning member in a moving direction of the disc accommodation section, when the positioning member is brought into contact with the disc accommodation section to position the disc accommodation section and the disc pushing member.

9. The disc changer according to claim 8, wherein the disc pushing member and the positioning member are integrally formed.

10. The disc changer according to claim 8, wherein the disc pushing member and the positioning member are in a two-body structures, a position of which is restricted in the moving direction of the disc accommodation section.

11. A disc changer comprising:

a disc accommodation section having two racks that are slidably superimposed and are configured to move in upward and downward directions, the disc accommodation section being configured to accommodate a plurality of discs in a space between the two racks;

a first lever section having a first lever and configured to be inserted into the space between the two racks at an insertion position and to separate the disc accommodation section in a vertical direction at the insertion position to form an extended space; and a second lever section having a second lever and configured to push out and discharge one disc from within the extended space, wherein the first and the second lever sections are disposed on a same rotation axis, and wherein the second lever section is configured to push one disc within the extended space, extended by the first lever section.

12. The disc changer according to claim 11, wherein a first through-hole slidably engaged with the rotation axis is provided in the cylindrical body of the second lever section, and a second through-hole slidably engaged with the rotation axis is provided in the cylindrical body of the first lever section.

13. The disc changer according to claim 12, further comprising a circumferential groove using the rotation axis as its center provided at a base of the second lever, a flange that holds the base of the second lever, and a circumferential wall that is inserted in the circumferential groove and projected from the flange, wherein the flange and the circumferential wall are provided at an upper end of the cylindrical body of the first lever section.

14. The disc changer according to claim 13, further comprising a tension spring is provided between a cylindrical body of the first lever section and a casing of the disc changer near the rotation axis, wherein the first lever is separated from the disc accommodation section.

15. The disc changer according to claim 14, wherein the first lever section and the second lever section are configured to be moved in a moving direction of the disc accommodation section on the rotation axis, and wherein when a wedge part of the first lever is brought into contact with the disc accommodation section before being inserted into the disc accommodation section, the first lever section and the second lever section move in a moving direction of the wedge part.

16. The disc changer according to claim 15, further comprising a driving mechanism for the first and the second lever sections including an operation lever having an operation input unit and an operation output unit, the operation output unit having a guide groove for guiding a projection provided on the second lever, wherein the guide groove is formed to restrict the second lever from entering into the disc accommodation section during rotation of the first lever.

* * * * *